(12) United States Patent
Sophiea et al.

(10) Patent No.: US 9,868,810 B2
(45) Date of Patent: Jan. 16, 2018

(54) POLYURETHANE PREPOLYMERS HAVING LITTLE OR NO PLASTICIZER AND THEIR USE IN VEHICULAR GLASS ADHESIVES

(71) Applicant: Dow Global Technologies LLC, Midland, MI (US)

(72) Inventors: Daniel P. Sophiea, Lake Orion, MI (US); Bindu Krishnan, Lake Jackson, TX (US); Laura A. Grier, Brazoria, TX (US); Caitlin E. Young, Birmingham, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/022,941

(22) PCT Filed: Nov. 24, 2014

(86) PCT No.: PCT/US2014/067072
§ 371 (c)(1),
(2) Date: Mar. 18, 2016

(87) PCT Pub. No.: WO2015/088756
PCT Pub. Date: Jun. 18, 2015

(65) Prior Publication Data
US 2016/0297918 A1    Oct. 13, 2016

Related U.S. Application Data

(60) Provisional application No. 61/913,654, filed on Dec. 9, 2013.

(51) Int. Cl.
| | |
|---|---|
| C08G 18/10 | (2006.01) |
| C08G 18/12 | (2006.01) |
| C08G 18/48 | (2006.01) |
| C08G 18/76 | (2006.01) |
| C08G 18/28 | (2006.01) |
| C08G 18/30 | (2006.01) |
| C09J 175/04 | (2006.01) |
| C09J 11/04 | (2006.01) |
| C09J 175/08 | (2006.01) |
| C08K 3/04 | (2006.01) |
| C08K 3/26 | (2006.01) |
| C08K 3/34 | (2006.01) |

(52) U.S. Cl.
CPC ........... *C08G 18/12* (2013.01); *C08G 18/283* (2013.01); *C08G 18/307* (2013.01); *C08G 18/4812* (2013.01); *C08G 18/4845* (2013.01); *C08G 18/7664* (2013.01); *C08G 18/7671* (2013.01); *C09J 11/04* (2013.01); *C09J 175/04* (2013.01); *C09J 175/08* (2013.01); *C08K 3/04* (2013.01); *C08K 3/26* (2013.01); *C08K 3/346* (2013.01); *C08K 2003/265* (2013.01)

(58) Field of Classification Search
CPC .. C08G 18/12; C08G 18/283; C08G 18/4812; C08G 18/4845; C09J 175/04; C09J 175/08
See application file for complete search history.

(56) References Cited

U.S. PATENT DOCUMENTS

| | | | | |
|---|---|---|---|---|
| 4,863,994 A * | 9/1989 | Nelson | .................. | C08G 18/282 252/182.25 |
| 5,922,809 A * | 7/1999 | Bhat | ...................... | C08G 18/10 156/108 |
| 6,255,433 B1 * | 7/2001 | Kuroda | .................. | C08G 18/12 524/267 |
| 2006/0079661 A1 * | 4/2006 | Zhu | ........................ | C08G 18/12 528/44 |
| 2008/0214769 A1 * | 9/2008 | Pohl | ....................... | C08G 18/12 528/44 |
| 2009/0030146 A1 * | 1/2009 | Berezkin | ............ | C08G 18/0823 524/591 |
| 2010/0152381 A1 * | 6/2010 | Savino | ................... | C08G 18/10 524/872 |

\* cited by examiner

*Primary Examiner* — Michael L Leonard
(74) *Attorney, Agent, or Firm* — The Dobrusin Law Firm, P.C.; Norman L. Sims

(57) ABSTRACT

An isocyanate terminated prepolymer has been discovered that has sufficiently low glass transition temperature (Tg), necessary rheological properties and mechanical properties that allows for the making of adhesive compositions useful for bonding substrates into larger structures (e.g., windows in vehicles and buildings) with minimal or no plasticizers. The polyether prepolymer comprises a polyisocyanate reaction product of a polyisocyanate having an isocyanate functionality of greater than 2 and a polyether monol having an average molecular weight (Mw) of 1000 to 2000 g/moles and said prepolymer having: (i) a weight molecular weight average (Mw) of about 2000 to about 30,000 g/mole, (ii) a free isocyanate content of 0.8% to 4% by weight of said prepolymer, and (iii) viscosity of 1000 to 50,000 centipoises.

20 Claims, No Drawings

POLYURETHANE PREPOLYMERS HAVING LITTLE OR NO PLASTICIZER AND THEIR USE IN VEHICULAR GLASS ADHESIVES

FIELD OF INVENTION

This invention relates to polyurethane prepolymers useful to make moisture cure adhesives. In particular, these polyurethane prepolymers are useful for making high green strength, fast curing adhesives for bonding glass into vehicles or buildings.

BACKGROUND OF INVENTION

Adhesive compositions are used to affix (bond) glass (windows) into buildings and vehicles, see Rizk, U.S. Pat. No. 4,780,520; Bhat, U.S. Pat. No. 5,976,305; Hsieh et al, U.S. Pat. No. 6,015,475 and Zhou, U.S. Pat. No. 6,709,539. In automobile factories, windows are installed using robots and computer controlled processing which facilitates the use of a variety of high performance adhesives. These adhesives have to be storage stable and be readily applied under high shear, for example, to a windshield, while retaining a bead shape so that the windshield can be properly fitted to the automobile. This has been achieved by one part moisture curable polyurethane prepolymer based adhesives having fillers, prepolymers having sufficient molecular weight and, in particular, plasticizers, so that they are still pumpable and can be applied to the windshield without stringing, sagging while also quickly obtaining and retaining the sufficient strength and elasticity (i.e., low glass transition temperature $T_g$) required of an adhesive over the large range of environmental conditions encountered by an automobile.

The ability to apply high viscosity adhesives via pumps imparting high shear rates and maintain good bead geometry or shape and while holding heavy components in place without the use of mechanical fixtures such as tape or clips or clamps has required plasticizers. This rheological behavior has required the use of high boiling point (e.g., boiling point greater than about 85° C.) solvents, referred to as plasticizers. Unfortunately, plasticizers such as phthalate have caused health concerns such as possibly being a carcinogen and recently have come under further regulation. Likewise, plasticizers are known to migrate from adhesives over time and volatilize degrading the adhesive and causing fogging of the windows in the vehicle.

What is needed is a prepolymer and adhesive composition for bonding glass into a structure which may be formulated, with little or no plasticizer while still exhibiting multiple desirable characteristics including: low viscosity, low isocyanate content, high yield value and recovery after shear, low glass transition temperature ($T_g$) even after exposure to accelerated weathering and over time which can result in phase separation of plasticizer from the matrix. In addition, the prepolymer should cure quickly after exposure to moisture with sufficient strength, elongation and Young's Modulus to have the windshield act as a structural element of the vehicle. It should also display quick buildup of strength and modulus to allow for fast safe drive away times when applied under a variety of conditions, while not displaying sag or string when applied even after undergoing high shear just prior to being applied.

Sag is the loss of the shape of the adhesive bead, often as the result of gravitational forces. If severe enough, this deformation can interfere in the proper installation and sealing of the window into the vehicle. Stringing of an adhesive is the formation of a long string of adhesive at the end of the bead of adhesive dispensed which can complicate application of the adhesive and cause imperfections in the installed adhesive bead.

SUMMARY OF INVENTION

An isocyanate terminated prepolymer has been discovered that has sufficiently low glass transition temperature ($T_g$), necessary rheological properties and mechanical properties that allows for the making of adhesive compositions useful for bonding substrates into larger structures (e.g., windows in vehicles and buildings) with minimal or no plasticizers. A first aspect of the invention is a method of forming an isocyanate terminated prepolymer comprising:
  a. providing, a polyisocyanate having an average isocyanate functionality of greater than 2 to 2.7
  b. reacting the polyisocyanate with a monol having an average molecular weight ($M_w$) of 1000 to 2,000 and a polyol to form the isocyanate prepolymer, the polyol and monol having an overall hydroxyl functionality that is from 1 to 3, and the polyol being comprised of
    i. a diol having an average molecular weight ($M_w$) of 500 to 8,000 grams/mole and
    ii. a triol having an average molecular weight ($M_w$) of 1500 to 4500 grams/mole, wherein, the monol is present in an amount from 40% to 60% of the hydroxyl groups in the polyol and monol, the diol is present in an amount from 5% to 35% of the hydroxyl groups present in the polyol and monol and the triol is present in an amount from 10% to 40% of the hydroxyl groups present in the polyol and monol and the isocyanate index is from 1.1 to 2.2.

A second aspect of the invention is an isocyanate terminated polyether prepolymer comprising a polyisocyanate reaction product of a polyisocyanate having an isocyanate functionality of greater than 2 and a polyether monol having an average molecular weight ($M_w$) of 1000 to 2000 g/moles and said prepolymer having: (i) a weight molecular weight average ($M_w$) of about 2000 to about 30,000 g/mole, (ii) a free isocyanate content of 0.8% to 4% by weight of said prepolymer, and (iii) viscosity of 1000 to 50,000 centipoises.

A third aspect of the invention is an adhesive composition comprised of the prepolymer of the first or second aspect of the invention, a filler, and an isocyanate catalyst. In a preferred embodiment, the adhesive composition surprisingly does not contain any plasticizer yet is still able to bond to the substrate, display good flexibility, not sag when applied over broad application temperatures, hold components in place without use of mechanical fixtures, does not become brittle over time and quickly develops the necessary strength, low temperature flexibility and modulus when installing a windshield or other substrate.

A variety of substrates may be bonded together using the adhesive composition for instance, plastics, glass, wood, ceramics, metal, coated substrates, such as plastics with an abrasion resistant coating disposed thereon, and the like. The compositions of the invention may be used to bond similar and dissimilar substrates together. The compositions are especially useful for bonding glass or a plastic with an abrasion resistant coating disposed thereon to other substrates such as vehicles and buildings. The compositions of the invention are also useful in bonding parts of modular components together, such as vehicle modular components. The glass or plastic with an abrasion resistant coating disposed thereon can be bonded to coated and uncoated portions of vehicles.

Surprisingly, the adhesive is pumpable at temperatures between about 20° C. and about 80° C., while exhibiting low sag and string even though the composition has little or no plasticizer. Preferably, the composition exhibits a sag of less than about 5 mm. This allows the adhesives prepared from the composition of the invention to be applied at a wide range of ambient temperatures. Heated application machinery is not necessary for the application of the adhesive, but surprisingly, the composition of this invention, may also be applied if warmed over ambient temperatures (i.e., greater than about 23° C. to about 90° C.).

Furthermore, the adhesive demonstrates rapid strength development which facilitates rapid drive away times of preferably one hour, and more preferably 30 minutes, after application of the adhesive at temperatures of from about 0° F. (−18° C.) to about 115° F. (46° C.). In particular, windshields installed under such conditions meet United States Federal Motor Vehicle Safety Standard (FMVSS) 212. In some preferred embodiments, the compositions of the invention are nonconductive and demonstrate a dielectric constant of about 15 or less. The compositions of the invention typically demonstrate a modulus after application for two weeks of about 1 MPa or greater, more preferably about 2 MPa or greater and preferably about 4 MPa or less according to ASTM D4065 measured at 25° C. This modulus is desirable because it allows for a compliant enough adhesive to absorb the vibrations and shock experienced by a windshield in an automobile and still has the strength to adhere the windshield in the automobile.

DETAILED DESCRIPTION OF INVENTION

Prepolymer

The isocyanate terminated prepolymer of this invention is present in sufficient quantity to provide adhesive character to the adhesive composition comprising the prepolymer. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least four months at ambient temperatures, in that it does not demonstrate an increase in viscosity during such period which prevents its application or use. For example, the viscosity should not rise too greatly to make it impractical to pump the adhesive composition. Preferably, the prepolymer or adhesive prepared therefrom does not undergo an increase in viscosity of more than about 50 percent during the stated period.

The prepolymer preferably has a free isocyanate content which facilitates acceptable strength in adhesives prepared from the prepolymers after 60 minutes and stability of the prepolymer. Preferably, the free isocyanate content is about 0.8 percent by weight or greater based on the weight of the prepolymer and more preferably about 0.9 percent by weight or greater, and preferably about 4.0 percent by weight or less, more preferably about 3.5 or less, even more preferably about 3.0 percent by weight or less, and even more preferably about 2.6 percent by weight or less. Above about 4.0 percent by weight, the adhesives prepared from the prepolymer may demonstrate lap shear strengths after 60 minutes that may be too low for the intended use. Below about 0.8 percent by weight, the prepolymer viscosity may be too high to handle and the working time may be too short.

The prepolymer preferably exhibits a viscosity, which facilitates formulation of a pumpable adhesive which has good green strength. Preferably, the viscosity of the prepolymer is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s) the prepolymer may be unstable and hard to dispense. Viscosity is measured using Brookfield viscometer at 20 rpm and #6 spindle at 23° C.±2° C.

When making the isocyanate terminated prepolymer of this invention, the polyisocyanate has an isocyanate functionality of greater than 2 to 2.7. It is understood that when referring to the isocyanate functionality, it is referring to the theoretical functionality, which can generally be calculated from the stoichiometry of the ingredients used, but the actual functionality may be different, for example, due to imperfections in raw materials, incomplete conversion of the reactants and formation of bi-products. The polyisocyanate, preferably, has an isocyanate functionality of at least about 2.2 or 2.4.

Any of polyisocyanates that realizes the aforementioned functionality may be used. For example, the polyisocyanates may be any aliphatic, cycloaliphatic, araliphatic, heterocyclic or aromatic polyisocyanate, or mixtures thereof. Illustratively, the polyisocyanates may include those disclosed by Wu, U.S. Pat. No. 6,512,033 at column 3, line 3 to line 49. More preferred isocyanates are aromatic isocyanates, alicyclic isocyanates and derivatives thereof. Preferably, the aromatic isocyanates have the isocyanate groups bonded directly to aromatic rings. Preferably, the polyisocyanate is comprised of an oligomer of an aromatic or cycloaliphatic polyisocyanate such as diphenylmethane-4,4'-diisocyanate (MDI), isophorone diisocyanate, tetramethylxylene diisocyanate or mixture thereof. Exemplary polyisocyanates include PAPI 94 or PAPI 27 available from The Dow Chemical Company, Midland, Mich.

Desirably, the equivalent weight of the polyisocyanate is at least about 80, more preferably at least about 110, and is most preferably at least about 120, and is preferably no greater than about 600, more preferably no greater than about 500, and most preferably no greater than about 300.

The amount of polyisocyanate used to prepare the prepolymer is that amount that gives the desired properties, that is, the appropriate free isocyanate content and viscosities as discussed herein. Preferably, the polyisocyanates are used to prepare in the prepolymer in an amount of about 1.1 equivalents of isocyanate (NCO) per equivalent of active hydrogen or greater (i.e., isocyanate index of 1.1 or greater), more preferably about 1.2 equivalents of isocyanate or greater and most preferably about 1.5 equivalents of isocyanate or greater. Preferably, the polyisocyanates used to prepare the prepolymer are used in an amount of about 2.2 equivalents of isocyanate or less (i.e., isocyanate index of 2.2. or less), more preferably 2.0 equivalents of isocyanate or less and most preferably about 1.9 equivalents of isocyanate or less.

The isocyanate terminated prepolymers are made from active hydrogen compounds such as described by U.S. Pat. No. 5,922,809 at column 4, line 38 to column 5, line 50 and Wu, U.S. Pat. No. 6,512,033 at col. 3, line 57 to col. 4, line 64. Preferably the active hydrogen compounds are polyols. Exemplary polyols include polyether polyols, poly(alkylene carbonate)polyols, hydroxyl containing polythioethers and mixtures thereof, which are also describe in the above cited references. The polyol (diols and triols) are preferably polyether polyols containing one or more alkylene oxide units in the backbone of the polyol. Preferred alkylene oxide units are ethylene oxide, propylene oxide, butylene oxide and mixtures thereof. Preferably, the polyol contains propylene oxide units, ethylene oxide units or a mixture thereof. The alkylene oxides can contain straight or branched chain alkylene units.

In an embodiment containing polyether polyols containing ethylene oxide (EO) and propylene oxide (PO) units, the ethylene oxide content in the prepolymer is typically about 20% to 80% by weight of the polyol. Desirably the EO content is 5% or 10% to 50%, 40% or 30% by weight of the polyol. When making the prepolymer with a polyether polyol a small amount of other polyols may be used to form the prepolymer such as a polyester polyol such as those known in the art. Typically, such other polyols may be present in an amount of about up to 5% by weight of the polyol used to make said prepolymer.

When the polyol is a polyether polyol, it may be random or a block polymer of differing polyether units. Desirably, the polyol is ethylene oxide-capped such as occurs when reacting glycerin with propylene oxide, followed by reacting the product with ethylene oxide (i.e., EO capped polyether polyol).

As per an embodiment, the polyol is comprised of a diol and triol. The diol has a weight average molecular weight ($M_w$) of 200 to 8000 grams. Preferably, the diol has an $M_w$ of 500 to 4,000, or 1,000 to 3,000 or 1,500 to 2,500 grams/mole. The triol has an $M_w$ of 100 to 10,000 grams/mole. Preferably, the triol has an $M_w$ of 700 to 6,000 or 1,500 to 4,500 grams/mole. Desirably, the triol has an EO content from about 5% to 60% by weight of the triol and preferably is from 10% or 15% to 50% or 30% of the triol by weight. Desirably, the diol has an EO content that is less than about 40%, 30%, 20%, 10%, 5% or even 0% by weight of the diol.

In the aforementioned embodiment, the amount of diol is present in an amount that is generally from about 5% to 35% of the hydroxyls present in the total amount of hydroxyls in the polyol and monol combined. Preferably the amount of diol is 10% or 12% to about 32% or 30%. Likewise, the amount of the triol is generally from about 10% to 40% of the hydroxyls present in the total amount of hydroxyls present in the polyol and monol combined. Preferably, the amount of triol is 15%, 20% or 25% to 35% of the hydroxyls present in the polyol and monol combined. The hydroxyl percentage is the amount of hydroxyls by number.

Exemplary polyols (diols and triols) include polyols available from The Dow Chemical Company, Midland, Mich. such as VORANOL™ 220-028 a 4000 molecular weight polyether diol, VORANOL™ 220-094, a propylene glycol initiated 1200 molecular weight homopolymer diol, VORANOL™ 220-110N a propylene glycol initiated 1000 molecular weight homopolymer polyether diol, VORANOL™ 220-260 a 425 molecular weight homopolymer polyether diol, VORANOL™ 220-530 an amine initiated polyether polyol, VORANOL™ 221-050 a 2200 molecular weight diol, VORANOL™ 222-029 a 4000 molecular weight polyether diol based on propylene oxide with ethylene oxide capping, VORANOL™ 222-056 a 2000 molecular weight polyether diol based on propylene oxide with ethylene oxide capping, VORANOL™ 2070 a glycerine initiated, 700 molecular weight, homopolymer triol polyol, VORANOL™ 225 a 250 molecular weight glycerine-initiated polyether triol, VORANOL™ 230-056 a glycerine-initiated homopolymer polyether triol with a nominal 3000 molecular weight, VORANOL™ a polyether homopolymer triol with a nominal molecular weight of 1500, VORANOL™ 230-660 a 250 molecular weight polyether triol, VORANOL™ 232-034 an EO capped polyether triol with nominal molecular weight of 4800, and VORANOL™ 232-035 a nominal 5000 molecular weight, EO capped polyether triol. The aforementioned molecular weights are $M_w$.

The polyisocyanate is also reacted with a monol. The monol has a $M_w$ of 1,000 to 2,000 grams/mole. Preferably, the monol has an $M_w$ of 1200 to 2,000, 1,900 or 1,800 grams/mole. The monol is one having a similar chemistry as described above for the polyol. Preferably, the monol has a polyether backbone and, in particular, one being comprised of EO and PO. Desirably, the EO and PO of the monol may be branched, blocked or random. Preferably, the monol has a polyether backbone of random EO and PO units. Desirably the amount of EO is 0 to 80 percent by weight of the monol. Preferably, the amount of EO is 1 or 2 to 50, 40 or 30 percent by weight of the monol with the remainder other than the hydroxyl being alkylene oxide unit such as PO.

The isocyanate prepolymer of the invention has an $M_w$ between 10,000 to about 80,000 g/mole. The "molecular weight average" used herein is the weight average molecular weight ($M_w$) molecular weight average as defined on page 17 of Textbook of Polymer Science $3^{rd}$ Edition, Billmeyer, F. W. Jr., John Wiley and Sons, NY, N.Y., 1984. Desirably, the $M_w$ average is at least in ascending desirability: 20,000, 30,000, 40,000, 50,000 and 55,000 to at most about 70,000 or even at most about 65,000.

The isocyanate terminated prepolymer may be prepared by any suitable method, such as bulk polymerization and solution polymerization. Exemplary processes useful to make the prepolymers are disclosed in U.S. Pat. No. 5,922,809 at column 9, lines 4 to 51. The polyurethane prepolymers are present in the adhesive composition in an amount sufficient such that when the resulting adhesive cures, substrates are bound together. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired value. "Isocyanate content" means the weight percentage of isocyanate moieties to the total weight of the prepolymer.

When making the isocyanate terminated prepolymer, it has been discovered that it may be preferable to react at least a portion of the monol of the polyol with the polyisocyanate prior to or simultaneously with the diol and triol of the polyol. If the monol is added after the polyol has been first reacted with the polyisocyanate, the prepolymer tends to have too high a viscosity or even gel. The portion of the monol reacted simultaneously or prior to reacting the polyol maybe any useful amount of the monol to be added. Illustratively, the amount may be at least 5%, 10%, 25%, 50% to 90% or even all of the monol being added simultaneously or prior to adding the polyol. Preferably, at least a portion of the monol is added prior to adding the polyol. When adding the monol prior to the monol, it is preferred that portion of the monol is added. That is not all of the monol is added prior to adding the polyol. The amount of the monol when added prior to the polyol is as described previously.

The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate, dibutyltin diacetate, dimethyl tin dilaurate and dimethyltin diacetate are known in the art as urethane catalysts, as are tertiary amines such as triethyldiamine and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate.

Adhesive Composition

The isocyanate terminated prepolymer is useful in making an adhesive composition. When making an adhesive composition using the prepolymer it is comprised of a filler and an a catalyst. In the adhesive composition, a prepolymer of this invention is typically present in an amount of about 20 parts by weight of the adhesive composition or greater, more preferably about 30 parts by weight or greater and most preferably about 35 parts by weight or greater. Preferably, the polyurethane prepolymers are present in an amount of about 60 parts by weight of the adhesive composition or less, more preferably about 50 parts by weight or less and even more preferably about 45 parts by weight or less.

The filler is generally necessary to achieve the rheological properties such as pumpability, sag and string necessary particularly when the adhesive composition is used to install windows in vehicles and buildings. The filler may be any useful such as those known in the art and include, for example, carbon black, calcium carbonate, coal or fly ash, clays and other inorganic particulates. Any combination or mixture of fillers may be used.

Typically, the total amount of the filler is about 27% to 50% by weight of the adhesive composition. It is preferred that at least a portion of the filler is carbon black. The carbon blacks depending on their structure and the molecular weight of the prepolymers may range over a wide range of structures as given by oil absorption number (ASTM D-2414-09). For example, the carbon black typically should be an oil absorption number (OAN) of about 80 to 200 ccs per 100 grams. Preferably, the oil absorption of the carbon is at least about 90, more preferably at least about 100, and most preferably at least about 110 to preferably at most about 180, more preferably at most about 165 and most preferably at most about 150 ccs/100 grams.

In addition the carbon black desirably has an iodine number that is at least 80. The iodine number is related to the surface area of the carbon black, but also to the presence of volatile species such as unsaturated oils and, sulfur containing compounds. The iodine number is determined using ASTM D1510-11.

The amount of carbon black suitable may be determined for a given carbon black by routine experimentation. Typically, the amount of carbon black is at least in ascending desirability, 5%, 10%, 15%, 18% or 23% to at most, in ascending desirability, 32%, 30% or 28% by weight of the adhesive composition.

The carbon black used in this invention may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include Monarch 5700, Monarch 580, Elftex 5100 or Elftex 7100 carbon blacks available from Cabot Arosperse, 11 carbon black available from Colombian Chemicals Company, Centerville, LN, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Co.

The adhesive also contains a catalyst which catalyzes the reaction of isocyanate moieties with water or an active hydrogen containing compound and include those already described above in making the prepolymer. The catalyst may be any catalyst known to the skilled artisan for the reaction of isocyanate moieties with water or active hydrogen containing compounds. Preferred catalysts include organotin compounds, metal alkanoates, and tertiary amines. Mixtures of classes of catalysts may be used. A mixture of a tertiary amine and a metal salt is desirable. Tertiary amines, such as dimorpholino diethyl ether (DMDEE), and a metal alkanoate, such as bismuth octoate are a preferred catalyst mixture. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. If the organo tin or metal alkanoate catalyst is present, it typically is present in an amount of about 60 parts per million or greater based on the weight of the adhesive, more preferably 120 parts by million or greater. The total amount of catalysts in the adhesive composition is generally at most about 3%, 2% or 1% to at least about 0.1%, 0.2% or 0.4% by weight of the adhesive composition.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino) alkyl) ether is (di-(2-(3,5-dimethyl-morpholino)ethyl)-ether). Tertiary amines are preferably employed in an amount, based on the weight of the adhesive of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

Surprisingly the prepolymer of this invention allows for an adhesive composition to be made without any plasticizer and still achieve the desired attributes (e.g., sag, string, fast cure, modulus, $T_g$, and adhesion). Even though some plasticizer may be used, the plasticizer preferably is one that is not comprised of a phthalate. When a plasticizer is used, typically it is present in an amount of at most about 10% and desirably, less than 5% by weight of the adhesive composition.

When used, the plasticizer should be free of water, inert to isocyanate groups and compatible with the prepolymer. Such material may be added to the reaction mixtures for preparing the prepolymer, or to the mixture for preparing the final adhesive composition, but is preferably added to the reaction mixtures for preparing the prepolymer and the adduct, so that such mixtures may be more easily mixed and handled. Suitable plasticizers are well known in the art and include straight and branched alkylphthalates, such as diisononyl phthalate, dioctyl phthalate and dibutyl phthalate, a partially hydrogenated terpene commercially available as "HB-40" and castor oil.

Preferred plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, aromatic sulfonamides and alkyl esters of natural oils such as soy, castor, sunflower, linseed and corn or alkyl esters of their individual fatty acids such as palmitic, oleic and linoleic. More preferred high polar plasticizers include aromatic sulfonamides, aromatic phosphate esters, dialkyl ether aromatic esters and alkyl esters of sulfonic acid. Most preferred plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZO-FLEX™ 2-45 diethylene glycol dibenzoate. Aromatic sulfonamides include KETJENFLEX™ 8 o and p, N-ethyl toluenesulfonamide.

The adhesive composition of the invention may further comprise a free polyfunctional isocyanate, for example, which may improve the modulus of the composition in the cured form or adhesion of the adhesion composition to particular substrates such as painted substrates. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 3 or greater. Preferably, the polyfunctional isocyanate has a nominal functionality of about 5 or less, even more preferably about 4.5 or less and most preferably about 3.5 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer AG under the trademark and designation DESMODUR N3300, and polymeric isocyanates such as polymeric MDI (methylene diphenyl diisocyanates) such as those marketed by The Dow Chemical Company under the trademark of Isonate or PAPI, including PAPI 20, PAPI 580N, PAPI 94 or PAPI 27 polymeric isocyanates.

The polyfunctional isocyanates, when present are typically present in an amount sufficient to impact the modulus of the cured compositions of the invention or improve the adhesion to certain substrates described above. The polyfunctional isocyanate, when present, is preferably present in an amount of about 0.5 parts by weight or greater based on the weight of the adhesive composition, more preferably about 1.0 parts by weight or greater and most preferably about 2 parts by weight or greater. The polyfunctional isocyanate is preferably present in an amount of about 8 parts by weight or less, based on the weight of the adhesive composition, more preferably about 5 parts by weight or less and most preferably about 4 parts by weight or less.

The adhesive composition of this invention may further comprise stabilizers, which function to protect the adhesive composition from moisture, thereby inhibiting advancement and preventing premature crosslinking of the isocyanates in the adhesive composition. Stabilizers known to the skilled artisan for moisture curing adhesives may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrolidinones such as 1 methyl-2-pyrolidinone, available from under the trademark M-PYROL. The hydrophilic material is preferably present in an amount of about 0.1 parts by weight or greater and more preferably about 0.3 parts by weight or greater and preferably about 1.0 parts by weight or less and most preferably about 0.6 parts by weight or less. Optionally, the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin, amorphous solid polyester and the like. The thixotrope may be added to the adhesive of a composition in a sufficient amount to give the desired rheological properties. Preferably, the thixotrope is present in an amount of about 0.01 parts by weight or greater based on the weight of the adhesive composition, preferably about 2 part by weight or greater.

Other components commonly used in adhesive compositions may be used in the composition of this invention. Such materials include those known in the art and may include ultraviolet stabilizers and antioxidants and the like.

As used herein, all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. As appropriate depending the components to be blended, the adhesive composition may be blended at an elevated temperature, for example, to melt components that may be solid at room temperature. For example, the temperatures utilized are typically room temperature or from about 40° C. to less than about 90° C. and more preferably about 50° C. to about 70° C. It may be advantageous to add any plasticizers, if desired, to the reaction mixture for preparing the isocyanate terminated prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794; relevant parts of all are incorporated herein by reference. Generally, the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide a working time of about 6 minutes or greater, and more preferably about 12 minutes or greater. Preferably, the working time is about 60 minutes or less and more preferably about 30 minutes or less.

The adhesive composition is preferably used to bond glass or plastic coated with an abrasion resistant coating, to other substrates such as bare or painted metals or plastics. In a preferred embodiment, the first substrate is a glass, or plastic coated with an abrasion resistant coating, and the second substrate is a window frame. In another preferred embodiment, the first substrate is a glass, or plastic coated with an abrasion resistant coating, and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In another embodiment, the compositions of the invention can be used to bond modular components together. Examples of modular components include vehicle modules, such as door, window or body.

Testing and Analytical Procedures

Hardness of the cured adhesive compositions was determined using a Shore A as per ASTM D2240-00.

The press flow viscosity was determined using SAE-J1524 and as follows. The uncured adhesive compositions were preconditioned to 23° C. and then measuring the amount by weight of material that passes through a nozzle having a diameter of 4 mm and bore length of 5 cm under an applied air pressure of 4 bar. The press flow viscosity is given in units of g/min The viscosity of the prepolymer was measured using a Brookfield Engineering D-VIII™ Viscometer employing a number 6 spindle at 20 rpm at 23±2° C. The initial viscosity was measured ~24 hours at ambient temperature (23° C.±2° C.) after preparation. The heat age viscosity is determined after aging for 24 hours and then aging at 65° C. for 3 days.

The Young's modulus, tensile strength and elongation of the cured adhesive (23° C.±2° C. at 50%±5% Relative Humidity) compositions were determined as per ASTM D638.

The tear strength of the cured adhesive compositions was determined as per ASTM D624.

The weight % of NCO in the prepolymers was determined by titration as per ASTM D2572-97 (2010).

TABLE 1

Raw Materials

| Component | Description | Supplier |
| --- | --- | --- |
| Voranol 232-036N | propylene glycol initiated polyoxypropylene based triol, 1558 hydroxy equivalent weight (HEW) | The Dow Chemical Company |
| Voranol 220-056N | propylene glycol initiated polyoxypropylene based diol, 1000 HEW | The Dow Chemical Company |
| Palatinol N | diisononylphthalate (DINP) | BASF Corporation North America |
| Dabco T-9 | stannous octoate | Air Products and Chemicals, Inc. |

TABLE 1-continued

Raw Materials

| Component | Description | Supplier |
|---|---|---|
| Diethyl Malonate (DEM) | diethyl malonate (DEM) | Solvadis GmbH |
| Synalox 80-130B | 2000 molecular weight monol based on 0.8/0.2 PO/EO | The Dow Chemical Company |
| UCON 50-HB-5100 | 3930 molecular weight monol based on 1:1 PO/EO | The Dow Chemical Company |
| UCON 50-HB-660 | 1590 molecular weight monol based on 1:1 PO/EO | The Dow Chemical Company |
| UCON 50-HB-260 | 970 molecular weight monol based on 1:1 PO/EO | The Dow Chemical Company |
| UCON 50-HB-170 | 750 molecular weight monol based on 1:1 PO/EO | The Dow Chemical Company |
| UCON 50-HB-100 | 520 molecular weight monol based on 1:1 PO/EO | The Dow Chemical Company |
| UCON 50 HB 55 | 270 molecular weight monol based on 1:1 PO/EO | The Dow Chemical Company |
| ISONATE 125M | 100% 4,4' methylenebis(diphenyl diisocyanate) MDI; % NCO = 33.1 | The Dow Chemical Company |
| ISONATE 50 OP | 1:1 w/w isomeric mixture of 4,4'-MDI and 2,4'-MDI e | The Dow Chemical Company |
| PAPI 94 | MDI mixture; equivalent weight = 130, functionality = 2.3 | The Dow Chemical Company |
| Elftex S S7100 | carbon black | Cabot Corporation |
| Pole Star R200 | Clay | Imersys Performance Materials |
| Drikalite | calcium carbonate | Imersys Performance Materials |
| DMDEE | 2,2'-dimorpholinodiethylether | Huntsman Corporation |
| Bicat 8 | bismuth octoate | The Shepher Chemical Company |
| Doverphos 4 | Trisnonylphenyl Phosphite | Dover Chemical Corporation |

"molecular weight" = $M_w$
"PO/EO" is the molar ratio

Illustrative Embodiments of the Invention

The following examples are provided to illustrate the invention, but are not intended to limit the scope thereof. All parts and percentages are by weight unless otherwise indicated.

Example And Comparative Example Prepolymer Preparation 3000 gm prepolymer batches were prepared individually in a 4000 ml Pyrex glass reactor fitted with 4-port ground glass lid to accommodate an air driven stirring blade, digital thermometer, dry nitrogen gas inlet and nitrogen outlet. The reaction temperature is controlled using heating jacket connected to an automatic electronic control module.

In Example 1, which is illustrative of the procedure, all of the isocyanate was added to the covered reactor through the nitrogen outlet port followed by 7% of the monol (M) while mixing. The temperature was raised to 43+/−2° C. and mixed for 10 minutes before addition of 0.04 wt % catalyst, stannous octoate. These were mixed for 30 minutes then all of the triol (T) was added and mixed for 30 minutes. Finally, the diol (D) and the rest of the monol were added, the temperature was set to 65° C. and the mixture was mixed for 60 minutes before 0.05 wt % diethyl malonate was added as a stabilizer. The prepolymer was allowed to cool and packaged in dry glass containers blanketed with dry nitrogen. A portion of the prepolymers were characterized as shown in Tables 2 and 3 and the remainder were made into adhesive compositions as shown in Tables 4 and 5. The order of addition (OOA) given in Table 3 for Example 1 was described as 7% M>T>D with it understood that the rest of the monol is added after the diol as described above.

In subsequent prepolymer batches the order of addition is similarly described by the amount and order of monol, triol and diol added to the reactor containing isocyanate, heated to 43° C. and mixed for 60 minutes or as All, wherein all the polyols were mixed with isocyanate, heated to 65° C. and mixed for 60 min From Tables 2 and 3, Comparative Examples 1 to 3 show when the isocyanate functionality of the polyisocyanate is 2 and the triol amount is too high and monol amount is too low regardless of the monol $M_w$ a pumpable prepolymer is possible, but they tend to be unstable (i.e., viscosity rises and NCO content decreases). Comparative Examples 4 and 5 show that when the $M_w$ of the monol is too great, the ability to adjust the iso/hydroxyl ratio so that the prepolymer does not gel even though excess diol is used was not possible. Comparative Example 6 shows that when there is greater amounts of triol added a pumpable prepolymer may be made. However, when these are made into an adhesive, as per Table 5, the properties of the adhesive are substantially reduced compared to the Examples of the invention.

Comparative Examples 7 and 8 show that when the monol has an insufficient $M_w$ and increased amount of triol is used to compensate, the prepolymers tend to become unstable or have too high an initial viscosity. Comparative Example 9 shows that when a greater amount of diol is used to make the prepolymer with the lower molecular weight monol and insufficient amount of monol, the prepolymer gels.

Comparative Examples 10 and 11, even though they made a pumpable prepolymer and are relatively stable, because too much diol is used to realize the viscosity the adhesive properties are not sufficient as shown in Table 5 compared to the properties of the Example adhesives.

Example 12 shows that when a too low $M_w$ monol and low concentration of monol and high concentration of triol, the prepolymer gelled. Examples 13 to 15 show that when compensating for the gelling by increasing the monol content of a low Mw monol, the viscosity could be achieved, but when these were put into an adhesive in a like manner as described herein, the adhesive sagged excessively and was not useable (properties not presented because unusable). Examples 16 to 18 are further Comparative Examples demonstrating that when insufficient monol and excessive triol are used the prepolymer is unstable or gels.

In contrast, when the monol, diol and triol are present in the proper amounts and of the required molecular weights as shown in Table 2 and Table 4, adhesives may be made having good properties in the absence of plasticizer. Further, Examples 16 and 17, which have nearly the same ratios of hydroxyls coming from the triol, diol and monol, and same amount of polyisocyanate, the resultant adhesive properties are improved (see Examples 5A and 6A) when using a monol comprised solely of PO units compared to a monol being comprised of 50% EO and 50% PO units.

The order of addition of the alcohols, depending on the amounts of each of them added, has been observed to have an effect. For example, when adding all of the alcohols at once when the amount of diol is substantially present, the batch to batch viscosity consistency was less desirable (see Examples 10 and 12). When the prepolymer was made with a substantial amount of triol it was observed that it was useful to add at least a portion of the monol first to realize a lower viscosity prepolymer (see Examples 7 to 9).

TABLE 2

Prepolymer Examples

| Prepolymer Example # | Triol 80% PO, 4500 Mw (wt. %) | Diol 100% PO, 2000 Mw (wt. %) | Monol 50% PO, 1600 Mw (wt. %) | Monol 100% PO, 1600 Mw (wt %) | MDI polymeric, 2.3 functional (wt %) | Total | Initial NCO (wt. %) |
|---|---|---|---|---|---|---|---|
| 1 | 29 | 11 | 46.19 | — | 13.75 | 100 | 1.92 |
| 2 | 31 | 12 | 43.14 | — | 13.8 | 100 | 2.05 |
| 3 | 28.5 | 10 | 47.7 | — | 13.74 | 100 | 2.12 |
| 4 | 30 | 11 | 45.16 | — | 13.78 | 100 | 2.23 |
| 5 | 29 | 11 | 46.16 | — | 13.78 | 100 | 2.42 |
| 6 | 29 | 11 | 46.16 | — | 13.78 | 100 | 2.11 |
| 7 | 30.64 | 12 | 43.5 | — | 13.8 | 100 | 2.07 |
| 8 | 30.64 | 12 | 43.5 | — | 13.8 | 100 | 2.04 |
| 9 | 30.64 | 12 | 43.5 | — | 13.8 | 100 | 2.04 |
| 10 | 13 | 31.5 | 42.5 | — | 12.93 | 100 | 1.44 |
| 11 | 13 | 31.5 | 42.5 | — | 12.93 | 100 | 1.42 |
| 12 | 13 | 31.5 | 42.5 | — | 12.93 | 100 | 1.45 |
| 13 | 11.44 | 30.9 | 43 | — | 14.6 | 100 | 2.07 |
| 14 | 10.34 | 30 | 45 | — | 14.6 | 100 | 2.24 |
| 15 | 10.34 | 30 | 45 | — | 14.6 | 100 | 2.72 |
| 16 | 17 | 34 | 32 | — | 17 | 100 | 2.7 |
| 17 | 16 | 33 | — | 34 | 17 | 100 | 2.71 |

| Prepolymer Example # | NCO 24 Hr after preparation (wt. %) | Viscosity 24 Hr. after preparation (centipoise × 1000) | Aged 3 Days @ 65° C. (NCO wt. %) | Aged 3 Days @ 65° C. Viscosity (centipoise × 1000) | Order of Addition |
|---|---|---|---|---|---|
| 1 | 1.92 | 16.8 | 1.94 | 20.8 | 7% M > T > D |
| 2 | 2.00 | 31.3 | 1.98 | 34.8 | 7% M > T > D |
| 3 | 2.07 | 19.6 | 2.03 | 19.7 | 7% M > T > D |
| 4 | 2.16 | 19.9 | 2.04 | 27.2 | 10% M > T > D |
| 5 | 2.2 | 14.6 | 2.05 | 23.8 | 10% M > T > D |
| 6 | 2.08 | 18.6 | 2.05 | 23.2 | 10% M > T > D |
| 7 | 2.02 | 25.5 | 2.03 | 28.9 | 50% M > T > D |
| 8 | 2.03 | 26.2 | 1.96 | 30.5 | 30% M > T > D |
| 9 | 2.01 | 40.9 | 1.93 | 35.2 | T > D > M |
| 10 | 1.43 | 38.8 | 1.39 | 46.1 | All |
| 11 | 1.41 | 89.8 | 1.39 | 58 | M > D > T |
| 12 | 1.45 | 34.1 | 1.43 | 36.7 | All |
| 13 | 2.07 | 20.2 | 2.04 | 25 | 50% M > T > D |
| 14 | 2.28 | 23 | 1.95 | 25.4 | 10% M > T > D |
| 15 | 2.02 | 19.2 | 2.02 | 18.6 | T > D > M |
| 16 | 2.67 | 32 | 2.60 | 34.5 | All |
| 17 | 2.69 | 40 | 2.64 | 42 | All |

TABLE 3

Prepolymer Comparative Examples

| Comp Example # | Triol 80% PO, 4500 Mw | Diol 100% PO, 2000 Mw | Monol 80% PO, 2000 Mw | Monol 50% PO, 3930 Mw | Monol 50% PO, 1600 Mw | Monol 50% PO, 970 Mw | Monol 50% PO, 750 Mw | Monol 50% PO, 520 Mw | Monol 50% PO, 270 Mw | MDI: 50% ortho-para |
|---|---|---|---|---|---|---|---|---|---|---|
| 1 | 44.22 | 30.5 | 11.12 | | | | | | | 14.1 |
| 2 | 44.22 | 30.5 | | | 11.12 | | | | | 14.1 |
| 3 | 44.22 | 30.5 | | | | 11.12 | | | | 14.1 |
| 4 | 20.85 | 50 | | 15 | | | | | | |
| 5 | 15.85 | 50 | | 20 | | | | | | |
| 6 | 32 | 12 | | | 40.69 | | | | | |
| 7 | 32.8 | 14.8 | | | | 36 | | | | |
| 8 | 33.95 | 23 | | | | 26.97 | | | | |
| 9 | 20.04 | 30 | | | | 33 | | | | |
| 10 | 18.7 | 29 | | | | 34.84 | | | | |
| 11 | 12 | 34 | | | | 36.14 | | | | |
| 12 | 39.74 | 21 | | | | | 20 | | | |
| 13 | 30 | 10 | | | | | 36.64 | | | |
| 14 | 31.03 | 22 | | | | | 26 | | | |
| 15 | 30 | 10 | | | | | | | 36.94 | |
| 16 | 31.43 | 22 | | | | | | | 26 | |
| 17 | 40.44 | 21 | | | | | | | 20 | |
| 18 | 29.94 | 19.5 | | | | | | 27 | | |

| Comp Example # | MDI polymeric, 2.3 functional (wt %) | Total | Initial NCO (wt. %) | NCO 24 Hr after prep. (wt. %) | Viscosity 24 Hr. after preparation (centipoise × 1000) | Aged 3 Days @ 65° C. (NCO wt. %) | Aged 3 Days @ 65° C. Viscosity (centipoise × 1000) | Order of Addition |
|---|---|---|---|---|---|---|---|---|
| 1 | | 100 | 1.97 | 1.95 | 48.2 | 1.87 | 76.8 | All |
| 2 | | 100 | 1.82 | 1.79 | 60.6 | 1.76 | 79.4 | All |
| 3 | | 100 | 1.77 | 1.75 | 70.4 | 1.66 | 77.8 | All |
| 4 | 14.1 | 100 | 1.32 | Gel | Gel | Gel | Gel | All |
| 5 | 14.1 | 100 | 1.83 | 1.7 | 73.1 | Gel | Gel | All |
| 6 | 15.25 | 100 | 1.86 | 1.88 | 26.7 | 1.84 | 34 | All |
| 7 | 16.34 | 100 | 2.38 | 2.14 | 8.2 | 1.73 | 49.7 | All |
| 8 | 16.02 | 100 | 1.78 | 1.71 | 145 | 1.65 | 146 | All |
| 9 | 16.9 | 100 | Gel | Gel | Gel | Gel | Gel | All |
| 10 | 17.4 | 100 | 1.92 | 1.91 | 21.6 | 1.91 | 36.6 | All |
| 11 | 17.8 | 100 | 2.22 | 2.22 | 20.5 | 1.91 | 24.6 | All |
| 12 | 19.2 | 100 | 2.07 | 2.04 | 82.6 | Gel | Gel | All |
| 13 | 23.3 | 100 | 2.38 | 2.44 | 31 | 2.41 | 31.8 | All |
| 14 | 20.9 | 100 | 2.19 | 2.15 | 51 | 2.11 | 55.9 | All |
| 15 | 23 | 100 | 2.32 | 2.05 | 37 | 2.09 | 40.6 | All |
| 16 | 20.5 | 100 | 3.3 | 2.6 | 47.7 | Gel | Gel | All |
| 17 | 18.5 | 100 | 2.51 | 1.68 | 46.9 | Gel | Gel | All |
| 18 | 23.5 | 100 | 1.92 | 1.81 | 77.2 | 1.68 | 92.4 | All |

Adhesive Composition Preparation:

Adhesives were prepared in 8 liter Double Planetary Mixer. To the clean and dry mixer, all prepolymer was added, the mixer lid was closed and vacuum pulled for 10 min, The mixer lid was opened and dry nitrogen gas is used to blanket the prepolymer. Fillers, dried at 200° C. for 16 to 20 hours, are added to the mixer, the lid is closed and mixer started for 5 min without vacuum and then 10 min under vacuum. The mixer is opened, the bowl blanketed with dry nitrogen while it and the blades are scraped down. Catalysts are added and mixing continued 10 min under vacuum before the sample is packaged into 300 ml aluminum cartridges and stored in aluminum pouches sealed with under dry nitrogen.

TABLE 4

Adhesive Examples

| | Adhesive Example # | | | | | |
|---|---|---|---|---|---|---|
| Component | 1A Wt % | 2A Wt % | 3A Wt % | 4A Wt % | 5A Wt % | 6A Wt % |
| Example 8 PP | 57 | | | | | |
| Example 1 PP | | 58 | | | | |
| Example 9 PP | | | 58 | | | |
| Example 3 PP | | | | 57 | | |
| Example 16 PP | | | | | 62 | |
| Example 17 PP | | | | | | 62 |
| Carbon Black | 21 | 21 | 21 | 21 | 16 | 16 |
| Clay | | | | | 21 | 21 |

TABLE 4-continued

Adhesive Examples

| | Adhesive Example # | | | | | |
|---|---|---|---|---|---|---|
| Component | 1A Wt % | 2A Wt % | 3A Wt % | 4A Wt % | 5A Wt % | 6A Wt % |
| Calcium carbonate | 20.5 | 20.5 | 20.5 | 20.5 | | |
| DMDEE | 0.25 | 0.25 | 0.25 | 0.25 | 0.25 | 0.25 |
| Bismuth octoate | 0.25 | 0.25 | 0.25 | 0.25 | 0.25 | 0.25 |
| TNPP | 1 | 0 | 0 | 1 | 0.5 | 0.5 |
| Total | 100 | 100 | 100 | 100 | 100 | 100 |
| Press Flow (g/min) | 150 | 96 | 170 | 72 | 55 | 65 |
| Hardness (Shore A) | 45 | 50 | 50 | 40 | 55 | 55 |
| Tensile Strength (psi) | 740 | 646 | 597 | 510 | 889 | 1230 |
| Elongation (%) | 255 | 299 | 304 | 275 | 275 | 245 |
| Young's Modulus (Mpa) | 1.4 | 1.4 | 1.4 | 1.0 | 1.9 | 2.2 |
| Tear (N/mm) | 8.6 | 8.8 | 11.3 | 7.8 | 15.2 | 16.5 |

"Example # PP" means the prepolymer of the Prepolymer Example identified was used

TABLE 5

Comparative Adhesive Examples

| | Adhesive Comparative Example # | | |
|---|---|---|---|
| Component | 1A Wt % | 2A Wt % | 3A Wt % |
| Comparative PP 6 | 56 | | |
| Comparative PP 10 | | 57 | |
| Comparative PP 11 | | | 57 |
| Carbon Black | 22 | 21 | 21 |
| Clay | | | |
| Calcium carbonate | 20.5 | 20.5 | 20.5 |
| DMDEE | 0.25 | 0.25 | 0.25 |
| Bismuth octoate | 0.25 | 0.25 | 0.25 |
| TNPP | 1 | 1 | 1 |
| | 100 | 100 | 100 |
| Press Flow | 294 | 80 | 46 |
| Hardness | 20 | 30 | 40 |
| Tensile Strength (psi) | 189 | 171 | 243 |
| Elongation (%) | 273 | 270 | 186 |
| Young's Modulus (Mpa) | 0.7 | 0.4 | 0.9 |
| Tear (N/mm) | 5.9 | 3.9 | 7.1 |

"Example # PP" means the prepolymer of the Prepolymer Comparative Example identified was used.

The invention claimed is:

1. A method of forming an isocyanate terminated prepolymer comprising:
   a. providing, a polyisocyanate having an average isocyanate functionality of about 2.2 to 2.7;
   b. reacting the polyisocyanate with a monol having an average molecular weight ($M_w$) of 1000 to 2,000 and a polyol to form the isocyanate prepolymer, the polyol and monol having an overall hydroxyl functionality that is from 1 to 3, and the polyol being comprised of
      i. a diol having an average molecular weight ($M_w$) of 500 to 8,000 grams/mole and
      ii. a triol having an average molecular weight ($M_w$) of 1500 to 4500 grams/mole, wherein, the monol is present in an amount from 40% to 60% of the hydroxyl groups in the polyol and monol, the diol is present in an amount from 5% to 35% of the hydroxyl groups present in the polyol and monol and the triol is present in an amount from 10% to 40% of the hydroxyl groups present in the polyol and monol and the isocyanate index is from 1.1 to 2.2.

2. The method of claim 1, wherein the monol has a polyether backbone.

3. The method of claim 1, wherein the polyether backbone of the monol is comprised of ethylene oxide and propylene oxide groups.

4. The method claim 3, wherein the polyether backbone of the monol is comprised of 20% to 80% of ethylene oxide groups with the remainder being propylene oxide groups.

5. The method of claim 1, wherein the reacting of the polyisocyanate and polyol and monol is such that at least a portion of the monol is reacted with the polyisocyanate prior to or simultaneously with the polyol.

6. The method of claim 5, wherein the portion of the monol is 10% to 100% by weight of the monol.

7. The method of claim 6, wherein the portion of monol not reacted prior to or simultaneously with the diol and triol is reacted subsequently.

8. The method of claim 1, wherein the polyisocyanate is comprised of methylene diphenyl diisocyanate and an oligomer of methylene diphenyl diisocyanate.

9. An isocyanate terminated polyether prepolymer comprising a polyisocyanate reaction product of a polyisocyanate having an isocyanate functionality of about 2.2 to 2.7 with a polyether monol having an average molecular weight ($M_w$) of 1000 to 2000 g/moles and a polyol to form the isocyanate prepolymer, the polyol and monol having an overall hydroxyl functionality that is from 1 to 3, and the polyol being comprised of a diol having an average molecular weight ($M_w$) of 500 to 8,000 grams/mole and a triol having an average molecular weight ($M_w$) of 1500 to 4500 grams/mole;
   wherein the monol is present in an amount from 40% to 60% of the hydroxyl groups in the polyol and monol, the diol is present in an amount from 5% to 35% of the hydroxyl groups present in the polyol and monol and the triol is present in an amount from 10% to 40% of the hydroxyl groups present in the polyol and monol and the isocyanate index is from 1.1 to 2.2; and said prepolymer having: (i) a weight molecular weight average ($M_w$) of about 2000 to about 30,000 g/mole, (ii) a free isocyanate content of 0.8% to 4% by weight of said prepolymer, and (iii) viscosity of 1000 to 50,000 centipoises.

10. The prepolymer of claim 9, wherein the polyisocyanate is comprised of a polymeric isocyanate.

11. The prepolymer of claim 10, wherein the polymeric isocyanate is an oligomer of hexamethylene diisocyanate, oligomer of methylene diphenyl diisocyanate or combination thereof.

12. The prepolymer of claim 9, wherein the prepolymer has an average molecular weight ($M_w$) of 2000 to about 28,000 g/mole.

13. An adhesive composition comprised of the prepolymer of claim 9, a filler, and an isocyanate catalyst.

14. The adhesive composition of claim 13, wherein the filler comprises from 20% to 60% of the weight of the composition.

15. The adhesive composition of claim 13, wherein the adhesive composition fails to have a plasticizer.

16. The adhesive composition of claim 13, wherein the adhesive composition has a plasticizer and the plasticizer is present in an amount less than or equal to 10% of the adhesive composition by weight.

17. The adhesive composition of claim 16, wherein the amount of plasticizer is less than or equal to 5% by weight of the adhesive composition.

18. The adhesive composition of claim 16, wherein the adhesive composition fails to have a phthalate plasticizer and the adhesive composition is comprised of an alkyl ester of sulfonic acid.

19. The method of claim 1, wherein the isocyanate prepolymer exhibits a viscosity of about 1,000 centipoise to about 100,000 centipoise, a weight molecular weight average (Mw) of about 2000 to about 30,000 g/mole, and a free isocyanate content of 0.8% to 4% by weight of said prepolymer and is useful for making high green strength, fast curing adhesives for bonding glass into vehicles or buildings wherein the adhesives are pumpable at temperatures from about 20° C. to about 80° C., in an uncured state exhibit a sag or less than 5 mm, and after two weeks from application exhibit a modulus of about 1 MPa or greater.

20. The prepolymer of claim 9 which is useful for making high green strength, fast curing adhesives for bonding glass into vehicles or buildings wherein the adhesives are pumpable at temperatures from about 20° C. to about 80° C., in an uncured state exhibit a sag or less than 5 mm, and after two weeks from application exhibit a modulus of about 1 MPa or greater.

* * * * *